United States Patent

[11] 3,626,247

[72] Inventor Edward P. Morse
Norwood, Mass.
[21] Appl. No. 839,019
[22] Filed July 3, 1969
[45] Patented Dec. 7, 1971
[73] Assignee Itek Corporation
Lexington, Mass.

[54] ANGULAR VELOCITY MEASUREMENT APPARATUS
11 Claims, 4 Drawing Figs.

[52] U.S. Cl. .................................................. 317/5, 317/6, 317/19
[51] Int. Cl. .................................................. G01p 3/56
[50] Field of Search .......................................... 317/5, 6, 19; 318/301, 309, 310, 311, 326

[56] References Cited
UNITED STATES PATENTS
2,995,705 8/1961 Walker et al. ................. 317/5 X
3,274,443 9/1961 Eggenberger et al. ......... 317/5
3,365,614 1/1968 Luongo et al. ................. 317/5
3,450,943 6/1969 Burke et al. ................... 317/5
3,450,944 6/1969 Burke .......................... 317/5
3,500,190 3/1970 Michon ......................... 317/5

Primary Examiner—Milton O. Hirshfield
Assistant Examiner—U. Weldon
Attorneys—Homer O. Blair, Robert L. Nathans and William C. Roch ABSTRACT: A system for measuring extremely slow angular velocities including both a DC tachometer and an optical encoder. The encoder output is converted into an average velocity indicating analog signal that is combined with the transient components of the tachometer output. The resultant control signal possesses both the average velocity indicating accuracy of the encoder and the instantaneous response of the tachometer.

ANGULAR VELOCITY MEASUREMENT APPARATUS

BACKGROUND OF THE INVENTION

This invention relates generally to a servomechanism for controlling extremely slow shaft velocities and especially relates to an angular velocity measurement system for use in such a servomechanism.

There exist various applications wherein extremely precise measurement of extremely slow shaft velocities must be made. Examples of such applications include the control of rate tables for gyro testing, control of film and tape transports, etc. In a typical requirement of this kind shaft velocities of the order of .02 degrees/sec. (72 arc-sec./sec.) in a bandwidth of 6 cycles per second must be measured with a noise component at a specified minimum level. Such requirements cannot be satisfied with presently known angular velocity measurement devices.

The most commonly employed angular velocity measurement devices are DC and AC tachometers, gyros and optical shaft encoders. Each of these devices has certain advantages but also exhibits inherent sources of error that prevent its satisfactory use in applications of the type described above. For example, the brushless DC tachometer is an analog device with a desirable instantaneous linear response and can be very low noise. However, the absolute accuracy of the tachometer is limited and can typically produce output voltages in error by as much as 5 percent. Conversely, an optical encoder can produce extremely accurate indications of incremental angular shaft positions but does not provide the instantaneous velocity response desired. Normally, some form of interpolation is used to create a substantially instantaneous encoder response. For example, one known optical encoder employs optical fringe zero crossings to produce extremely accurate position indicating pulses every 40-arc seconds and produces interpolation pulses at 5 arc-second intervals between the zero crossings. The interpolation pulses are obtained by electronically estimating the position optical sine wave of the encoder as if it were a true sine wave. However, because the optical sine wave is a distorted summation of many elements within the encoder, the interpolation pulses are inaccurate and introduce noise which is not acceptable. The gyro is another analog device with good velocity measurement sensitivity in addition to absolute accuracy. Again, however, the gyro produces noise that makes instantaneous measurement difficult.

The object of this invention, therefore, is to provide a low noise system that instantaneously measures extremely slow shaft velocities with a high degree of accuracy.

CHARACTERIZATION OF THE INVENTION

The invention is characterized by the provision of an angular velocity measurement system including a tachometer for producing an output signal indicating instantaneous angular velocity of a shaft and an optical encoder for producing a pulsed output signal indicating incremental angular positions of the shaft. A combining circuit utilizes the pulsed encoder input to produce an analog signal that accurately represents average velocity of the shaft. The analog signal is combined with the tachometer outputs' transient components that represent instantaneous variations in shaft velocity. A resultant control signal possesses both the average velocity indicating accuracy of the encoder and the instantaneous response of the tachometer.

One feature of the invention is the provision of a velocity measurement system of the above type wherein the combining circuit includes a filter circuit connected to receive the tachometer output and a precisely timed pulse counting circuit connected to receive the encoder output. The filter circuit extracts the transient components from the tachometer output and the pulse count registered by the counter circuit represents average shaft velocity during precisely controlled counting periods.

According to one featured embodiment of the invention the filter circuit is a high pass filter that passes only tachometer output transients that are algebraically summed in the combining circuit with the average velocity indicating analog signal produced with the encoder output. In this embodiment the transients passed by the filter circuit provide instantaneous corrections of the highly accurate average velocity signal so as to produce a control signal that also correctly reflects instantaneous changes in shaft velocity.

According to another featured embodiment of the invention the filter circuit is a low pass filter that passes only the steady state component of the tachometer output and the combining circuit compares this steady state signal with the analog signal produced with the encoder output. The difference between the compared signals represents the inherent error in the tachometer output. This correction signal is combined with the raw tachometer output again providing a control signal dependent upon both the average shaft velocity represented by the encoder output and instantaneous velocity changes represented by the transients in the tachometer output.

According to still another featured embodiment of the invention, the tachometer output is filtered in a low pass filter and converted into a pulse train having a frequency dependent upon average shaft velocity. These pulses are compared with the encoder output in a precisely time controlled up-down counter circuit. In this case the difference pulse count registered in the counter is used to produce an analog correction signal that represents inherent tachometer error. As above, the correction signal is combined with the raw tachometer output to again produce a control signal dependent upon both average shaft velocity indicated by the encoder output and instantaneous velocity changes represented by transients in the tachometer output.

The invention is further characterized by the provision of a servomechanism including a servo motor driven in response to a reference signal from a source of command and controlled by a control unit utilizing one of the velocity measurement systems described above.

DESCRIPTION OF THE DRAWINGS

These and other features and objects of the present invention will become more apparent upon a perusal of the following specification taken in conjunction with the accompanying drawings wherein.

DESCRIPTION OF THE PREFERRED EMBODIMENTS

Figure 1:
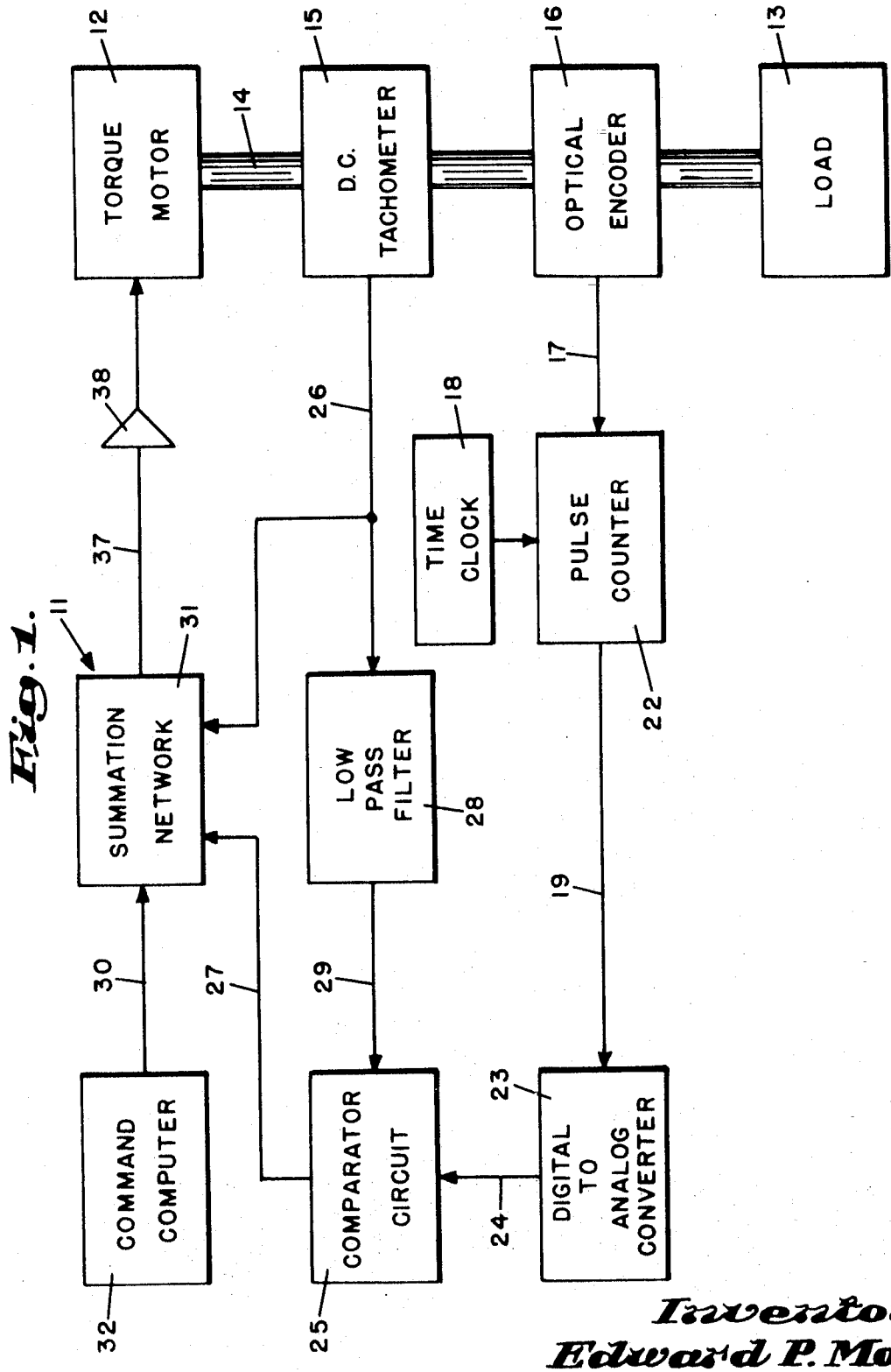
FIG. 1 is a schematic block diagram illustrating a preferred servomechanism embodiment of the invention.

Referring now to FIG. 1 there is shown the servomechanism 11 including the torque motor 12 coupled to the load 13 by the rotatable drive shaft 14. Also mechanically coupled to the shaft 14 are the tachometer 15 and the optical encoder 16. The tachometer 15 and the encoder 16 are conventional and can comprise, for example, a brushless DC tachometer that produces a continuous DC output voltage having a value linearly proportional to the instantaneous angular velocity of the shaft 14 and an optical encoder of the zero fringe crossing type noted above.

The pulsed output from the encoder 16 is fed on signal line 17 into the converter circuit including the pulse counter 22 and the digital to analog converter 23. By counting the pulses received on signal line 17 over unit time periods measured by the precision time clock 18, the pulse counter 22 produces on signal line 19 a digital output representing the average angular velocity of the shaft 14 during the counting periods. This signal is converted by the digital to analog converter 23 into a DC output supplied on line 24 to the voltage comparator circuit 25. Also received by comparator 25 on line 29 is the steady state output of the tachometer 15 produced by filtering the raw tachometer output on line 26 in low pass filter 28. After extraction of transients in filter 28 the voltage on line 29 also reflects average shaft velocity.

A correction voltage on line 27 which is the difference between signals 24 and 29 and the raw tachometer output voltage on line 26 are applied to the voltage summing network 31. Also applied to the summation network 31 by the command computer 32 on line 30 is a reference voltage in opposition to the voltage on line 26. The algebraic summation of the voltages on lines 26, 27 and 30 is amplified by the amplifier 38 and applied to the torque motor 12.

Figure 2:
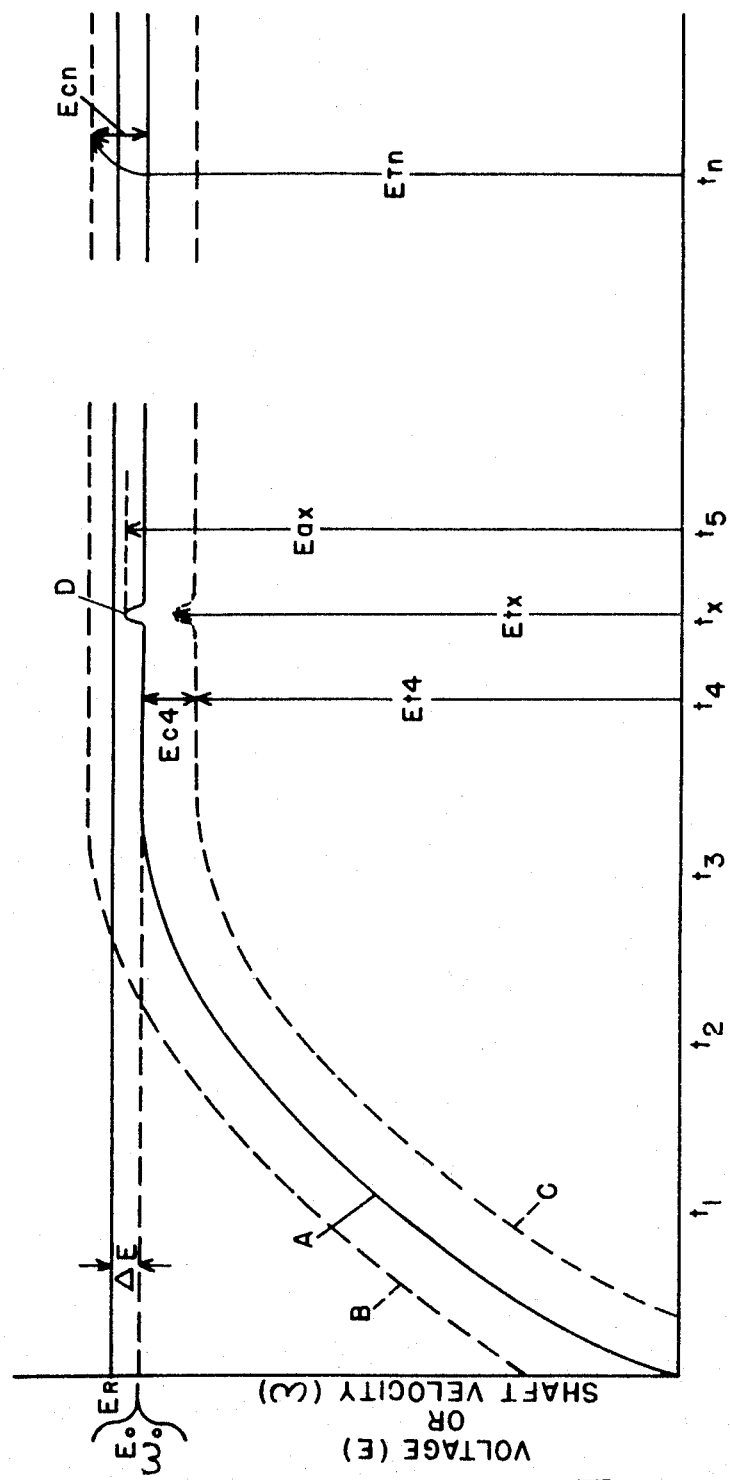
FIG. 2 is a graph illustrating operating response characteristics of the system shown in FIG. 1.

Operation of the servomechanism 11 will be described with reference to FIG. 2 wherein either shaft velocity ($\omega$) or velocity proportional voltage (E) are plotted versus time. Initially, conventional operation will be described with the effect of the comparator 25 ignored. At start-up the computer 32 provides on line 30 a predetermined reference voltage $E_R$ (FIG. 2) substantially equal to the voltage that the tachometer 15 is expected to produce in response to a desired shaft velocity. Application of this voltage to the torque motor 12 initiates rotation of the shaft 14 which accelerates as shown by curve A. The tachometer 15 responds to shaft rotation by generating an increasing output voltage that, assuming absolute accuracy, would correspond to the velocity curve A. Since the tachometer output is subtracted from the reference voltage $E_R$ in the summing network 31, the voltage applied to the amplifier 38 is continuously reduced until time $t_3$ when the output of the tachometer reaches an equilibrium value $E_o$. At that point a minimum difference voltage $\Delta E$ representing the servo-error continues to energize the motor 12. The servo-error voltage E, which can be reduced by increasing the gain of amplifier 38, produces a constant shaft velocity of the desired value $w_o$ again assuming absolute tachometer accuracy. Any change in that value alters the tachometer output voltage and introduces a compensating change in the summing network output so as to restore equilibrium.

However, because of various factors including variable ambient temperature, wear, nonuniform flux coupling over a full revolution, etc. the tachometer output does not accurately reflect shaft velocity and may be in error by, for example, ±5 percent. Consequently, the tachometer 15 actually can produce output voltages and corresponding shaft velocities anywhere in a range defined by the dotted curves B and C. Precise extremely slow shaft velocity control is not possible therefore with a conventional tachometer servomechanism.

The problem of tachometer error is alleviated in the present invention by the additional use of the encoder 16 that produces interpolation pulses representing incremental angular positions of the shaft 14. As described above, these interpolation pulses are not very accurate and can be in error by as much as ±0.6 arc-seconds. However, the pulse to pulse error is not cumulative so that the percentage error can be practically eliminated by considering only angular movements represented by a large number of pulses. Furthermore, by counting pulses during precise time periods of known length an indication of average shaft velocity during the counting period is obtained. The pulse counter 22, therefore, produces on line 19 a periodic digital output that accurately indicates average shaft velocity during precise counting periods established by the time clock 18. This digital output is converted into analog form by the digital to analog converter circuit 23. Thus, the average velocity of the shaft 14 is represented by the output voltage on line 24 periodically corrected at times $t_1$, $t_2$, $t_3$ etc. (FIG. 2) determined by the time clock 18.

The voltages produced on lines 24 and 29 therefore are compatible signals representing angular velocity of the shaft 14. A correction voltage equal to the difference between these signals is produced on line 27 by the comparator 25. The correction voltage is algebraically added to the tachometer output voltage in the summing network 31 producing a corrected voltage that is compared to the reference voltage on line 30 as described above. This corrected voltage retains the instantaneous velocity response inherent in the tachometer output but with a correction factor resulting from the more accurate long term output of the digital to analog converter circuit 23.

Of course, since both the filtered voltage on line 29 and the periodically corrected output voltage on line 24 represent average rather than instantaneous values of shaft velocity, the correction signal on line 27 also does not represent instantaneously accurate corrections of the tachometer output. However, the error in the tachometer output voltage remains substantially constant over relatively short durations. Consequently, the correction voltage on line 27 does effectively compensate for inherent tachometer error present on the output voltage on line 26.

To explain further the operation of the system 11, reference is made again to FIG. 2. Let us assume an inherent tachometer error that produces a tachometer output voltage corresponding to dotted curve C in response to actual shaft velocity corresponding to curve A so that at time $t_4$ the tachometer output voltage equals $E_{t4}$. In the absence of correction the erroneously low tachometer voltage would result in an equilibrium shaft velocity greater than the desired value $\omega_o$. This does not occur in the present system because the encoder 16 initiates at time $t_4$ an accurate voltage $E_o$ in response to a shaft velocity $\omega_o$. Comparison in circuit 25 of this voltage with the filtered tachometer voltage $E_{t4}$ on line 29 results in a correction voltage $(E_o - E_{t4}) = +E_{c4}$ on line 27. Addition of the correction voltage $+E_{c4}$ and the tachometer voltage $E_{t4}$ in the summing network 31 produces a corrected voltage $E_o$ that results in the desired equilibrium velocity $\omega_o$.

It will be noted in the simplified example above that the encoder initiated analog voltage on line 24 was equal to the corrected voltage finally produced in the summing network 31. That was because of the assumption that the encoder output correctly indicated actual shaft velocity. This will not be always true because, as noted above, the converted encoder output on line 24 represents periodically checked average velocity rather than instantaneous velocity. For example, assume the occurrence of a transient disturbance in the load 13 that at time $t_x$ alters the velocity of the shaft 14 to above desired velocity $\omega_o$ shown by curve portion D in FIG. 2. This transient velocity change would not be instantaneously reflected in the converted encoder output voltage on line 24 which would continue at the average value $E_o$ determined at time $t_4$ or in the filtered tachometer output on line 29. Consequently, the correction voltage on line 27 would continue to be $(E_o - E_{t4}) = +E_{c4}$. Conversely, the unfiltered output of the tachometer 15 on line 26 would instantly indicate the transient condition by an increased voltage value $E_{tx}$. Addition of this tachometer voltage $E_{tx}$ with the correction voltage $E_{c4}$ in the summing network 31 results in an instantaneously accurate corrected voltage $E_{nx}$ that is compared with reference voltage E. The increased value of the correction voltage $E_{nx}$ produces a reduction in the output of the summing network 31 on line 37 and a corresponding decrease in the velocity of the motor 12 so as to quickly restore equilibrium conditions.

As noted above, the inherent tachometer output error remains substantially constant during relatively short periods permitting the use of a correction voltage based on average shaft velocity. Nevertheless, the error magnitude and even its sense can change over more lengthy periods so that a fixed error compensation in the output voltage will not remain accurate. For example, at time $t_n$ (FIG. 2) after some extended period of operation the tachometer 15 may produce an erroneously high output voltage $E_{tn}$ in response to a shaft speed of $\omega_o$. The modified tachometer output could be caused by various factors including changed ambient temperature, wear, etc. The converted encoder output E on line 24 again will correctly reflect the assumed shaft velocity $\omega_o$. Comparison in circuit 25 of this voltage with the filtered tachometer voltage $E_{tn}$ on line 29 results in a correction voltage $(E_o-E_{tn})=-E_{cn}$ on line 27. Algebraic summation of the correction voltage $-E_{cn}$ and the tachometer voltage $E_{tn}$ in the summing network 31 produces a corrected voltage $E_o$ for comparison with the reference voltage E and maintains the desired equilibrium velocity $w_o$.

Thus, the system 11 utilizes the tachometer 15 and encoder 16 in such a manner as to derive the advantages of both (instantaneous tachometer response and long term encoder accuracy) without the disadvantages of either. It will be obvious that these advantages would accrue also in applications wherein the reference voltage on line 30 is varied in a predetermined manner to produce desired changes in the velocity of the shaft 14.

Figure 3:
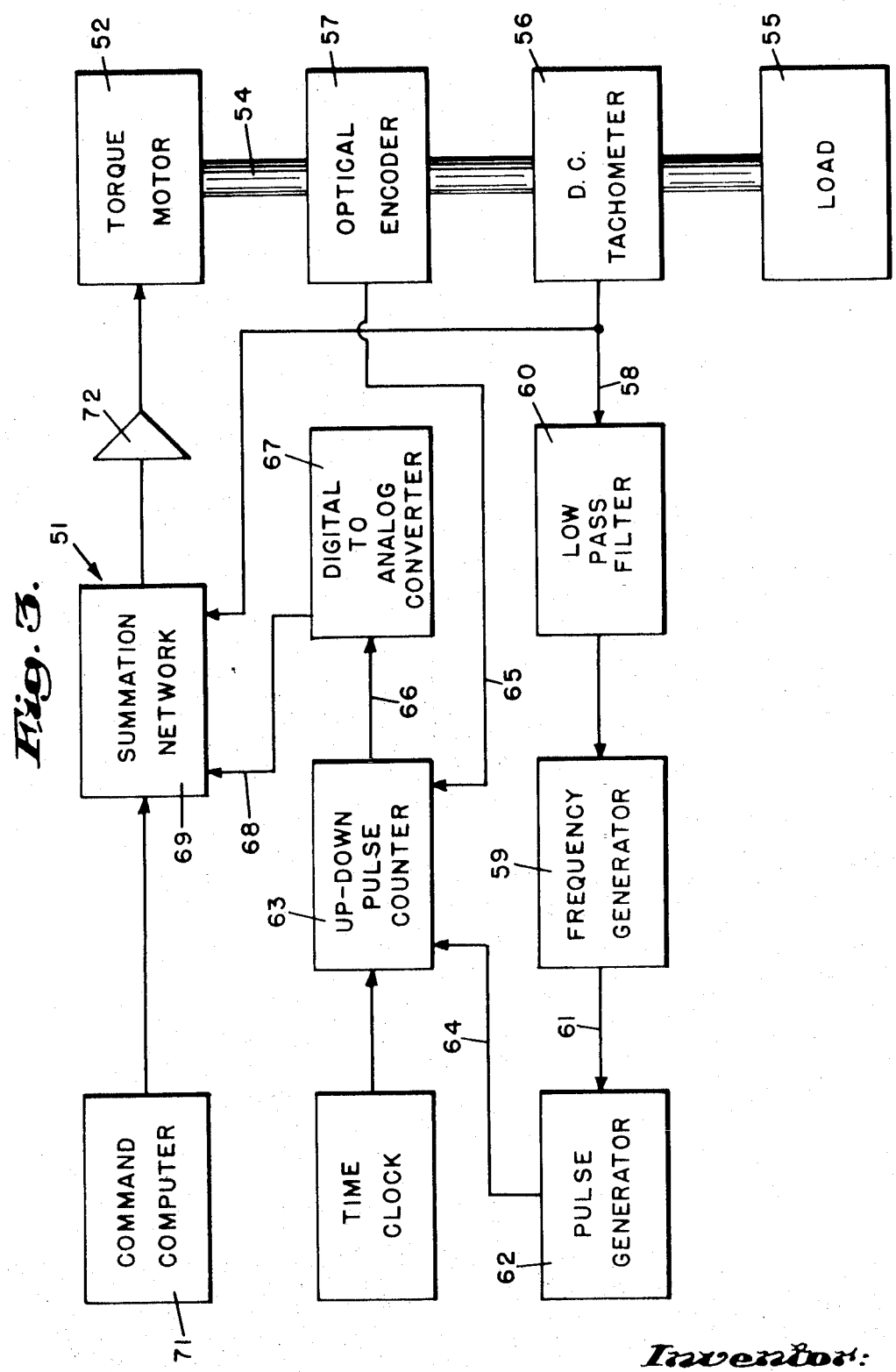
FIG. 3 is a schematic block diagram of another preferred embodiment of the invention.

Referring now to FIG. 3 there is shown another preferred servomechanism 51 embodiment of the invention. Again, a conventional torque motor 52 is energized to drive a shaft 54 coupled to the load 55. Also mechanically coupled to the shaft 54 are the conventional DC tachometer 56 and the optical encoder 57 which can be, for example, the types described above in connection with FIG. 1. The output of the tachometer 56 on line 58 is a DC voltage representing the instantaneous angular velocity of the shaft 54 and is applied to the frequency generator 59 after being filtered in the low pass filter 60. The frequency generator 59 produces on line 61 an AC signal having a frequency proportional to the value of the DC voltage on line 58. This AC signal is converted by the pulse generator 62 into a pulse train that is transmitted into the up-down counter circuit 63 on signal line 64. Since the pulse rate on line 64 is proportional to the angular velocity of the shaft 54, each pulse represents an incremental angular position thereof.

Also received by the up-down counter 63 on line 65 is the pulsed output of the optical encoder 67 which, of course, also represents angular positions of the shaft 54. The conventional counter 63 produces on line 66 a digital output corresponding to the difference between the numbers of pulses received on lines 64 and 65 during unit time periods established by the precision time clock 70. This digital output is converted into analog form by the digital to analog converter 67 providing a correction signal on line 68. Algebraic summation in the summing network 69 of the correction voltage online 68 and the tachometer output voltage on line 58 produces a corrected DC signal voltage that is compared to the reference voltage output of the command computer 71. The difference between the correction voltage and the reference voltage is applied to the torque motor 52 after amplification in the servo amplifier 72.

The operation of the servomechanism 51 is similar to that described in connection with the servomechanism 11 shown in FIG. 1. However, in this embodiment, it is the DC output of the tachometer 56 that is converted by the frequency generator 59 and pulse generator 62 into a signal compatible with the pulsed output of the encoder 57. As in the above embodiment, the compatible signals are then compared producing a correction voltage. Since the incremental position indicating pulses on lines 64 and 65 are counted during unit time periods in the counter 63, the converted analog voltage on line 66 represents the difference between the average shaft velocities measured by the tachometer 56 and the encoder 57. As above, the encoder 57 provides an extremely accurate indication of average velocity while the output of the tachometer 56 is inherently inaccurate. Thus, the correction signal on line 68 represents the average error in the tachometer output. By algebraically combining the correction signal with the raw tachometer output in the summing network 69, one again obtains a corrected voltage that accurately represents the instantaneous angular velocity of the shaft 54.

Figure 4:
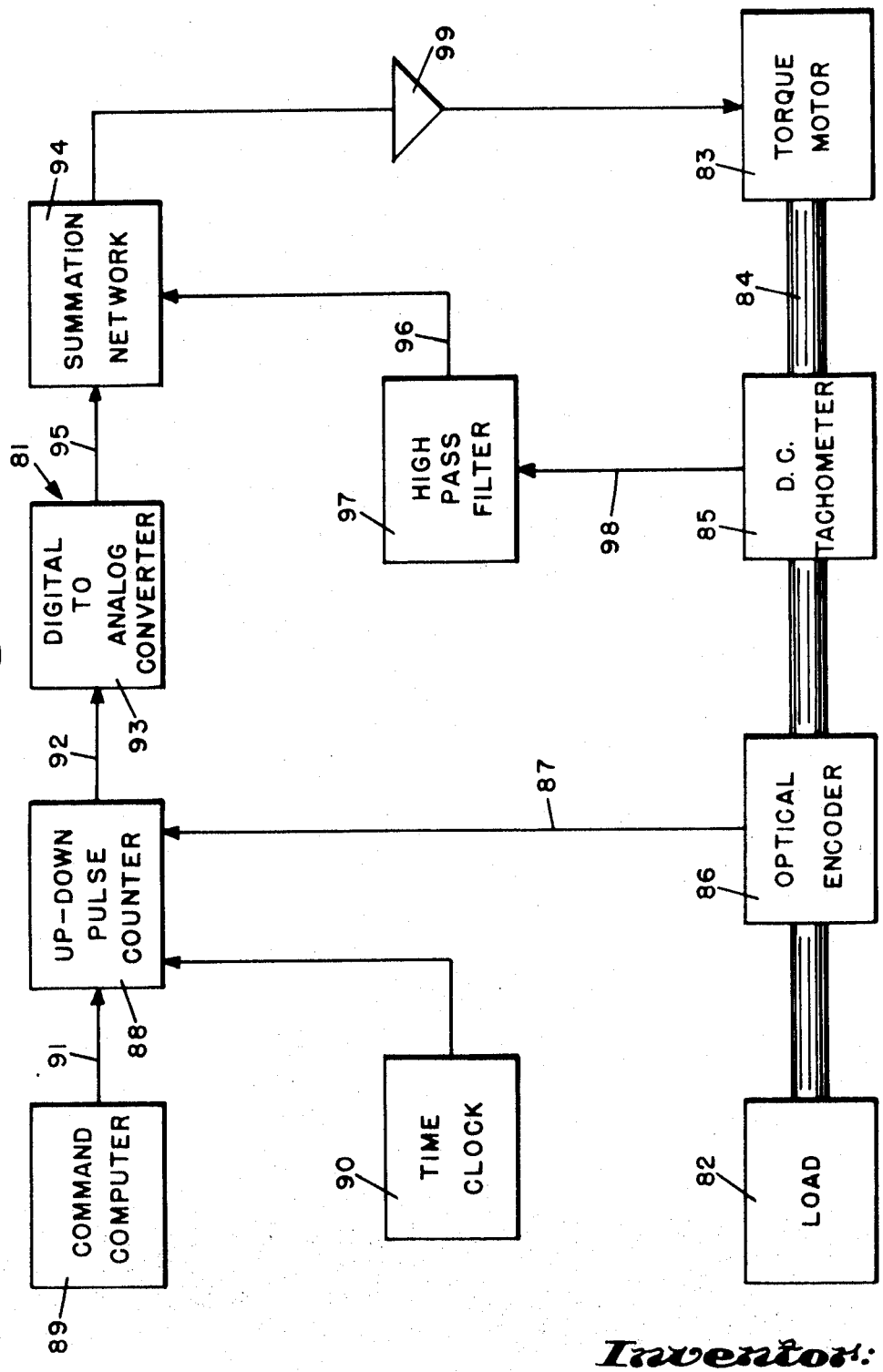
FIG. 4 is a schematic block diagram of another preferred embodiment of the invention.

FIG. 4 shows another embodiment 81 of the present invention having the load 82 driven by the torque motor 83 via the drive shaft 84. Also coupled for rotation with the shaft 84 are the tachometer 85 and the optical encoder 86 which again can be of the type described above. The pulsed encoder output on line 87 is fed into the up-down pulse counter 88 that also receives reference pulses from the command computer 89 on line 91. The output of the up-down counter 88 on line 92 is a digital output representing the difference between the number of pulses received on lines 87 and 91 during unit time periods established by the precision time clock 90. This digital output is converted into analog form by the digital to analog converter 93 and applied to the summing network 94 on line 95. Also received by the summing network 94 on line 96 is the output of the high pass filter 97 that in turn receives on line 98 the output voltage from the tachometer 85. The output of the summing network 94 is applied to the torque motor 83 after amplification in the servo-amplifier 99.

In this embodiment the command computer 89 provides on line 91 a digital output required to establish the desired velocity of the shaft 84. The up-down counter 88 compares the numbers of pulses received on lines 87 and 91 during unit time periods established by the precision time clock 90 and produces a difference output on line 92. Thus, the digital output on line 92 and the converted analog signal on line 95 are error signals corresponding to the difference between a desired shaft velocity represented by the reference signal on line 91 and actual shaft velocity represented by the encoder output on line 87. However, as described above, a count of encoder output pulses during a unit time period represents average rather than instantaneous shaft velocity. Consequently, the error voltage on line 95 indicates the difference between the desired velocity and the average velocity of the shaft 84.

A system responsive to instantaneous shaft velocity is achieved by combining the error signal on line 95 with the filtered tachometer output on line 96. Because of the high pass filter 97, only high frequency transient components of the tachometer output on line 98 are passed to the summing network 94 on line 96. These high frequency components, of course, represent transient changes in shaft velocity caused by, for example, load disturbances. Thus, as in the embodiment of FIGS. 1 and 3, the control voltage applied to the torque motor 83 includes the accurate average velocity information provided by the encoder 86 and the instantaneous velocity response provided by the tachometer 85.

As further explanation, the operation of embodiment 81 in response to the above assumed operating conditions will be described again with reference to FIG. 2. At time $t_4$ the command computer 89 provides a digital output corresponding to $E_R$ on line 91 and the encoder 86 also provides on line 87 an output corresponding to $E_o$ in response to the desired shaft velocity $w_o$. The output on lines 92 and 95, therefore, is equal to the servo error voltage $\Delta E$. Since the assumed shaft velocity at time $t_4$ is free of transients, a zero output is also present on output line 96 of the high pass filter 97. Thus, the summing network 94 provides no corrective error voltage and the torque motor 83 continues to run at the desired equilibrium velocity $w_o$. At time $t_x$ the output of the up-down counter 88 continues at the balanced $\Delta E$ level established at time $t_4$. However, the transient change in shaft velocity represented by curve portion D produces a transient increase $(E_{tx}-E_{t4})$ in the output voltage of the tachometer on line 98. This transient is passed by the high pass filter 97 to the summing network 94. Subtraction of the transient voltage $(E_{tx}-E_{t4})$ from the $\Delta E$ voltage appearing on line 95 results in a negative correction voltage that is applied to the torque motor 83 so as to reduce motor speed and reestablish the desired equilibrium shaft velocity $w_o$.

Obviously, many modifications and variations of the present invention are possible in light of the above teachings. It is to be understood, therefore, that the invention can be practiced otherwise than as specifically described.

What is claimed is:

1. Angular velocity measurement apparatus comprising a velocity responsive transducer means for producing a first output signal indicating the instantaneous angular velocity of a mechanism, a position responsive transducer means for producing a second output signal indicating incremental angular positions of the mechanism, and combining circuit means for combining said first and second output signals so as to produce a control signal having a value dependent upon both the average angular velocity of the mechanism as indicated by said second output signal and instantaneous changes in its angular velocity indicated by transients in said first output signal.

2. Angular velocity measurement apparatus according to claim 1 wherein said combining circuit comprises filter circuit means for extracting the transient components from said first output signal.

3. Angular velocity measurement apparatus according to claim 1 wherein said position responsive transducer means produces a pulsed output indicative of said incremental angular positions and said combining circuit means comprises converter circuit means for converting said pulses output into an angular velocity proportional signal.

4. Angular velocity measurement apparatus according to claim 3 wherein said converter circuit means comprises counter means for counting during given time periods the pulses in said pulsed output.

5. Angular velocity measurement apparatus according to claim 4 wherein said filter circuit means is a high-pass filter circuit connected to receive said first output signal and adapted to pass only the transient components thereof.

6. Angular velocity measurement apparatus according to claim 5 wherein said combining circuit is adapted to produce said control output signal by algebraically summing said velocity proportional output signal and said transient components.

7. Angular velocity measurement apparatus according to claim 6 wherein said velocity responsive transducer means comprises a tachometer, and said position responsive transducer means comprises an optical encoder.

8. Angular velocity measurement apparatus according to claim 4 wherein said filter circuit means is a low-pass filter circuit connected to receive said first output signal and adapted to pass only the steady state component thereof, and said combining circuit includes a comparator that determines the difference between said velocity proportional output signal and said steady state component to produce a correction signal that is combined with said first signal.

9. Angular velocity measurement apparatus according to claim 8 wherein said velocity responsive transducer means comprises a tachometer, and said position responsive transducer means comprises an optical encoder.

10. Angular velocity measurement apparatus according to claim 2 wherein said filter circuit means is a low-pass filter circuit connected to pass only the steady state component of said first output signal; and said combining circuit comprises a converter circuit for converting said steady state component into a converted pulsed output, and a comparator for comparing during given time periods said second output signal and said converted pulsed output so as to produce a difference analog signal representing the difference therebetween, and said difference analog signal is combined with said first output signal to produce said control signal.

11. Angular velocity measurement apparatus according to claim 10 wherein said velocity responsive transducer means comprises a tachometer, and said position responsive transducer means comprises an optical encoder.

* * * * *